(12) United States Patent
Klee et al.

(10) Patent No.: US 11,979,040 B2
(45) Date of Patent: May 7, 2024

(54) METHOD, DEVICE, AND SYSTEM FOR DETECTING ELECTRICAL FAULT DURING CHARGING AND DISCHARGING OF A BATTERY PACK

(71) Applicant: Robert Bosch GmbH, Stuttgart (DE)

(72) Inventors: Christoph Klee, Stuttgart (DE); Mickael Segret, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 373 days.

(21) Appl. No.: 17/380,155

(22) Filed: Jul. 20, 2021

(65) Prior Publication Data

US 2022/0029432 A1 Jan. 27, 2022

(30) Foreign Application Priority Data

Jul. 24, 2020 (DE) .................. 10 2020 209 399.7

(51) Int. Cl.
*H02J 7/00* (2006.01)
(52) U.S. Cl.
CPC ............ *H02J 7/0029* (2013.01); *H02J 7/005* (2020.01); *H02J 7/00712* (2020.01)
(58) Field of Classification Search
USPC ................................................ 320/134, 132
See application file for complete search history.

(56) References Cited

U.S. PATENT DOCUMENTS

| 8,255,176 B2 * | 8/2012 | Plestid ................. G01R 31/392 324/426 |
| 2005/0017686 A1 | 1/2005 | Sakakibara et al. |
| 2006/0087286 A1 * | 4/2006 | Phillips ............... H01M 10/441 320/114 |
| 2012/0112700 A1 * | 5/2012 | Morimoto ......... H02J 7/007182 320/132 |
| 2013/0329925 A1 * | 12/2013 | Boguslavskij .......... H02J 50/10 381/323 |

FOREIGN PATENT DOCUMENTS

| DE | 10 2016 209 822 A1 | 12/2017 |
| DE | 10 2017 106 908 A9 | 12/2017 |
| WO | 2013/144195 A1 | 10/2013 |
| WO | 2020/043386 A1 | 3/2020 |

* cited by examiner

*Primary Examiner* — Samuel Berhanu
(74) *Attorney, Agent, or Firm* — Maginot, Moore & Beck LLP

(57) ABSTRACT

A method detects electrical fault states of at least one removable battery pack and/or an electrical device, in particular a charging device, a diagnostic device or an electrical consumer, that can be connected to the at least one removable battery pack, using a first monitoring unit integrated in the at least one removable battery pack and a further monitoring unit integrated in the electrical device. The first monitoring unit and the further monitoring unit each count the faulty charging or discharging processes.

11 Claims, 2 Drawing Sheets

METHOD, DEVICE, AND SYSTEM FOR DETECTING ELECTRICAL FAULT DURING CHARGING AND DISCHARGING OF A BATTERY PACK

This application claims priority under 35 U.S.C. § 119 to patent application no. DE 10 2020 209 399.7, filed on Jul. 24, 2020 in Germany, the disclosure of which is incorporated herein by reference in its entirety.

The disclosure relates to a method for detecting electrical fault states of at least one removable battery pack and/or an electrical device, in particular a charging device, a diagnostic device or an electrical consumer, that can be connected to the at least one removable battery pack, by means of a first monitoring unit integrated in the at least one removable battery pack and a further monitoring unit integrated in the electrical device. The disclosure further relates to a system for carrying out the method.

BACKGROUND

A multiplicity of electrical consumers are operated using battery packs that can be removed without tools by the operator—referred to as removable battery packs in the following text and that are discharged accordingly by the electrical consumer and can be recharged again by means of a charging device. Such removable battery packs usually consist of a plurality of energy storage cells interconnected in series and/or in parallel for achieving a requested removable battery pack voltage or capacity. If the energy storage cells are designed as lithium-ion cells (Li-ion), for example, a high power and energy density can particularly advantageously be achieved. On the other hand, to prevent electrical fault states, such cells also require compliance with strict specifications regarding the maximum charging and discharge current, the voltage and the temperature.

In modern removable battery packs, the cell voltage of the parallel-connected energy storage cells of what is known as a cell cluster is evaluated, for example, by a monitoring unit integrated in the removable battery pack. The term "cell voltage" should accordingly be understood not only as the voltage of an individual energy storage cell but also that of a cell cluster consisting of parallel-interconnected energy storage cells. So-called single cell monitoring (SCM) of this type is known, for example, from WO 20043386 A1, in which dangerous operation of the removable battery pack in the event of a fault is also precluded by redundant monitoring.

In order for a charging device or an electrical consumer to know with which charging or discharge current a removable battery pack may be operated at a maximum, this is generally communicated by electrical coding, for example by coding resistors integrated in the removable battery pack that are measured by the electrical device and compared with a stored table, mechanical coding or a communication interface. DE 10 2016 209 822 A1 likewise discloses that the electrical device communicates to the removable battery pack that it may not continue to be used. The cell voltages can also be transmitted to the device via such an interface.

Proceeding from the prior art, it is the object of the disclosure to assign any fault states arising during a charging or discharging process to the respective charging or discharging partners in order to restrict or to block said partners in a targeted manner for further charging or discharging processes using other charging or discharging partners where necessary.

SUMMARY

It is proposed according to the disclosure that both the first monitoring unit and the further monitoring unit each count the faulty charging or discharging processes. In this way, an individual charging or discharging partner can advantageously be restricted or blocked themselves for further charging or discharging processes in the case of faulty charging or discharging processes that occur too frequently. Therefore, an increased degree of safety can even then be ensured if further charging or discharging partners that are not designed for monitoring of the fault states according to the disclosure are intended to be present.

In the context of the disclosure, electrical consumers should be understood to mean, for example, power tools operated using a removable battery pack for performing work on workpieces by means of an electrically driven insert tool. The power tool may in this case be realized both as a hand-held power tool and as a floor-standing machine power tool. Typical power tools in this context are hand-held or floor-standing drills, screwdrivers, impact drills, hammer drills, planers, angle grinders, orbital sanders, polishing machines, circular, bench, miter and jig saws or the like. However, gardening appliances operated using a removable battery pack such as lawn mowers, lawn trimmers, pruning saws or the like and also domestic appliances operated using a removable battery pack such as vacuum cleaners, mixers, etc., may also be included under the term electrical consumer. The disclosure can likewise be applied to electrical consumers that are supplied with power using a plurality of removable battery packs at the same time.

The voltage of a removable battery pack is generally a multiple of the voltage of an individual energy storage cell and results from the interconnection (in parallel or in series) of the individual energy storage cells. An energy storage cell is typically designed as a galvanic cell, which has a structure in which one cell pole comes to lie at one end and a further cell pole comes to lie at an opposite end. In particular, the energy storage cell at one end has a positive cell pole and at an opposite end a negative cell pole. The energy storage cells are preferably designed as lithium-based energy storage cells, for example Li-ion, Li—Po, Li-metal or the like. However, the disclosure can also be applied to removable battery packs with Ni—Cd, Ni—MH cells or other suitable cell types. In current Li-ion energy storage cells with a cell voltage of 3.6 V, for example voltage classes of 3.6 V, 7.2 V, 10.8 V, 14.4 V, 18 V, 36 V etc. are produced. An energy storage cell is preferably designed as an at least substantially cylindrical round cell, wherein the cell poles are arranged at ends of the cylinder shape. However, the disclosure is not dependent on the type and construction of the energy storage cells used but can be applied to any removable battery packs and energy storage cells, for example also pouch cells or the like in addition to round cells.

It should furthermore be noted that the configuration of the electromechanical interfaces of the removable battery packs and the electrical devices that can be connected thereto and also the associated receptacles for force-fitting and/or form-fitting releasable connection are not intended to be the subject of this disclosure. A person skilled in the art will select a suitable embodiment for the interface depending on the power or voltage class of the electrical device and/or the removable battery pack. The embodiments shown in the drawings are therefore to be understood as purely exemplary. It is thus possible, in particular, to also use interfaces having more than the illustrated electrical contacts.

The disclosure furthermore makes provision for a faulty charging or discharging process to be present when relevant charging or discharging parameters, in particular of the removable battery pack, for example a temperature value, a charging or discharge current, a voltage, a cell voltage, a remaining capacity or the like, are outside of their limit values required for a permissible operating range. The charging or discharging process is terminated or reduced by the first monitoring unit or the further monitoring unit and/or the at least one removable battery pack or the electrical device are blocked for future charging or discharging processes when a defined limit value of maximum permitted faulty charging or discharging processes is exceeded by the at least one removable battery pack or the electrical device.

In addition, the first monitoring unit and the further monitoring unit each additionally count the successful charging or discharging processes. A charging or discharging process is then terminated or reduced by the first monitoring unit or the further monitoring unit and/or the at least one removable battery pack or the electrical device are blocked for future charging or discharging processes when the ratio of the successful charging or discharging processes to the overall number of all charging or discharging processes falls below a defined threshold value, in particular 30%. As a result, each charging or discharging partner can separately determine an individual reliability value, which makes it possible for it to assess whether the cause of an identified fault state lies with it or with the respective other charging or discharging partner.

In addition, provision can be made for identification information to be exchanged between the first and the further monitoring unit such that both monitoring units concomitantly detect the counted charging or discharging processes of the respective other monitoring unit in order to calculate a reliability value therefrom. The reliability values calculated in this way can furthermore be exchanged between the first and the further monitoring unit of the two current charging or discharging partners. Therefore, in the case of a plurality of different charging or discharging partners, for example when four removable battery packs are charged alternately by three charging devices and are discharged by five electrical consumers, it is possible to reliably assess with which of the charging or discharging partners the cause for an identified fault state lies.

Additionally, the counted charging or discharging processes and/or the calculated reliability values can each be stored in chronological order by the first and the further monitoring unit. A higher weighting of more recent events compared to older events is thus advantageously possible, for example. However, it could likewise also be expedient to give less weight to an individual detected fault state from the more recent past than a plurality of detected fault states that are considerably further back in the past, in particular when in the meantime fault-free charging or discharging processes have also been identified.

When the number of faulty charging or discharging processes is reset by the first monitoring unit and/or the further monitoring unit in each case after a successful charging or discharging process, this can advantageously be considered as an indication of the removable battery pack and/or the electrical device being capable of carrying out a successful charging or discharging process, such that the cause for a previously identified fault state must lie with another charging or discharging partner.

In another configuration of the disclosure, provision is made for a piece of information about the number of faulty charging or discharging processes and/or about the reliability values to be signalled to the operator in an acoustic, optical and/or haptic manner at the at least one removable battery pack and/or at the electrical device. This makes it easier for the operator to assess which of the charging or discharging partners involved he must possibly dispose of or have repaired.

The disclosure also relates to a system comprising at least one removable battery pack having a first monitoring unit and a first electromechanical interface having a plurality of electrical contacts, and also an electrical device, in particular a charging device, a diagnostic device or an electrical consumer, having a further monitoring unit and a further electromechanical interface having a plurality of electrical contacts, wherein in each case a first of the electrical contacts of the interfaces is designed as an energy supply contact that can be supplied with a first reference potential, preferably a supply potential, in each case a second of the electrical contacts of the interfaces is designed as an energy supply contact that can be supplied with a second reference potential, preferably a ground potential, and in each case a third of the electrical contacts of the interfaces is designed as a signal or data contact for data exchange of the first and the further monitoring unit. The electrical contacts of the first and the further interface are connected to one another in order to carry out the method according to the disclosure.

In order to make it easier for the operator to assess which of the charging or discharging partners involved he must possibly dispose of or have repaired, the at least one removable battery pack and/or the electrical device each have an optical, acoustic and/or haptic signaling means for signaling a piece of information about the number of faulty charging or discharging processes and/or about the reliability values.

BRIEF DESCRIPTION OF THE DRAWINGS

The disclosure is explained by way of example in the following text based on FIGS. 1 and 2, wherein identical reference signs in the figures indicate identical component parts with an identical function.

In the drawings.

DETAILED DESCRIPTION

Figure 1:
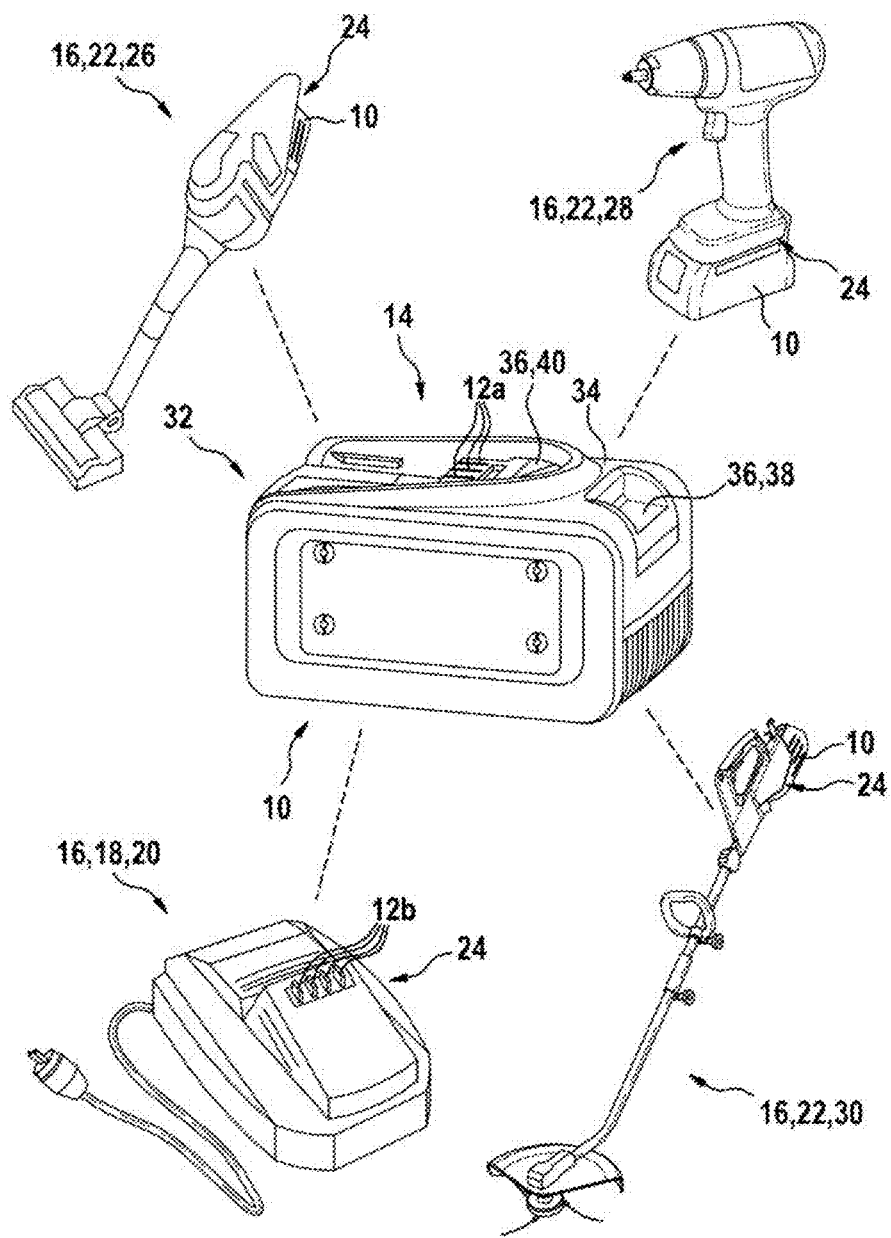
FIG. 1: shows a schematic illustration of a system comprising at least one removable battery pack and at least one electrical device that can be connected to the removable battery pack for charging or discharging the removable battery pack.

FIG. 1 shows a system comprising a removable battery pack 10 having a first electromechanical interface 14 having a plurality of electrical contacts 12a and an electrical device 16, in particular a charging device 18, a diagnostic device 20 or an electrical consumer 22, having a further electromechanical interface 24 having a plurality of electrical contacts 12b. FIG. 1 is intended to illustrate that the system according to the disclosure is suitable for various electrical devices 16 operated using removable battery packs 10 without restricting the disclosure. In this case, a cordless vacuum cleaner 26, a cordless impact wrench 28 and a cordless lawn trimmer 30 are shown by way of example. In the context of the disclosure, however, a wide variety of power tools, gardening appliances and domestic appliances can be considered as electrical consumers 22. The number of removable battery packs 10 within the system can also be changed. The system can thus indeed also comprise a plurality of removable battery packs 10. It should furthermore be noted that, although in FIG. 1 the charging device 18 and the diagnostic device 20 are illustrated as one and the same electric device 16 because a charging device 18 can indeed also have a diagnostic function, it is conceivable, without restricting the disclosure, that the diagnostic device 20 does not have a charging function but serves only for pure diagnostics of the removable battery pack 10 for electrical fault states.

The removable battery pack 10 is essentially a conventional removable battery pack having a housing 32, which has on a first side wall or the top side 34 thereof the first electromechanical interface 14 for releasable connection to the electromechanical interface 24 of the electrical device 16. In connection with the electrical consumer 22, the first and the further electromechanical interface 14, 24 primarily serve to discharge the removable battery pack 10 while, in connection with the charging device 18, it serves to charge and, in connection with the diagnostic device 20, it serves for fault diagnosis of the removable battery pack 10. The precise configuration of the first and the further electromechanical interface 14, 24 is dependent on different factors, such as the voltage class of the removable battery pack 10 or the electrical device 16 and various manufacturer specifications, for example. It is thus possible to provide, for example, three or more electrical contacts 12a for energy and/or data transmission between the removable battery pack 10 and the electrical device 16. Mechanical coding is also conceivable, such that the removable battery pack 10 can be operated only at specific electrical devices 16. Since the mechanical configuration of the first electromechanical interface 14 of the removable battery pack and the further electromechanical interface 24 of the electrical device 16 is insignificant for the disclosure, this will not be dealt with in more detail here. Both the person skilled in the art and an operator of the removable battery pack 14 and the electrical device 16 will make the suitable selection in this regard.

The removable battery pack 10 has a mechanical arresting apparatus 36 for arresting the form-fitting and/or force-fitting releasable connection of the first electromechanical interface 14 of the removable battery pack 10 at the corresponding mating interface 24 (not shown in detail) of the electrical consumer 22. In this case, the arresting apparatus 36 is designed as a sprung pushbutton 38, which is operatively connected to an arresting member 40 of the removable battery pack 10. Due to the suspension of the pushbutton 38 and/or the arresting member 40, the arresting apparatus 36 automatically latches into the mating interface 24 of the electrical consumer 22 when the removable battery pack 10 is inserted. If an operator presses the pushbutton 38 in the insertion direction, the arresting system is released and the operator can remove or eject the removable battery pack 10 from the electrical consumer 22 counter to the insertion direction.

As already mentioned at the beginning, the battery voltage of the removable battery pack 10 usually results from a multiple of the individual voltages of the energy storage cells (not shown) depending on their interconnection (in parallel or in series). The energy storage cells are preferably designed as lithium-based battery cells, for example Li-ion, Li—Po, Li-metal and the like. However, the disclosure can also be applied to removable battery packs with Ni—Cd, Ni-MH cells or other suitable cell types.

Figure 2:
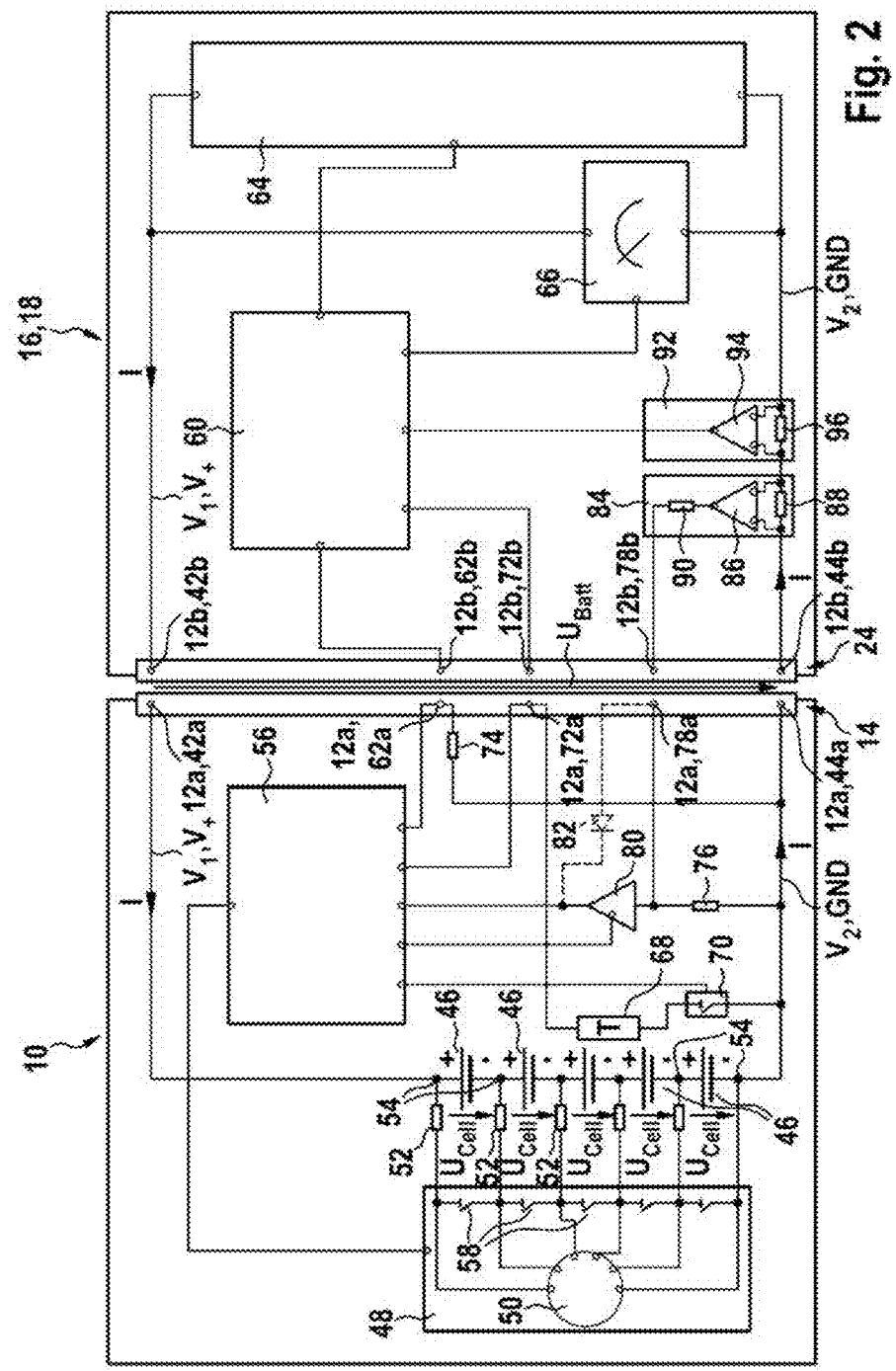
FIG. 2: shows the system from FIG. 1 as a block diagram with a removable battery pack and an electrical device designed as a charging device.

In FIG. 2, the system from FIG. 1 is illustrated in a block diagram with the removal battery pack 10 on the left-hand side and the electrical device 16 designed as a charging device 18 on the right-hand side. The removable battery pack 10 and the charging device 18 have the mutually corresponding electromechanical interfaces 14 and 24 having a plurality of electrical contacts 12a, 12b, wherein in each case a first of the electrical contacts 12a, 12b of the interfaces 14, 24 serves as an energy supply contact 42a, 42b that can be supplied with a first reference potential $V_1$, preferably a supply potential $V_+$, and in each case a second of the electrical contacts 12a, 12b of the interfaces 14, 24 serves as an energy supply contact 44a, 44b that can be supplied with a second reference potential $V_2$, preferably a ground potential GND. On the one hand, the removable battery pack 10 can be charged by the charging device 18 via the first and the second energy supply contact 42a, 44a. On the other hand, discharge of the removable battery pack 10 is also effected via the same for the case that the electrical device 16 is designed as an electrical consumer 22. The term "can be supplied with" is intended to illustrate that the potentials $V_+$ and GND, in particular in the case of an electrical device 16 designed as an electrical consumer 22, are not permanently applied to the energy supply contacts 42b, 44b but only after connection of the electrical interfaces 14, 24. The same applies for a discharged removable battery pack 10 after connection to the charging device 18.

The removable battery pack 10 has a plurality of energy storage cells 46, which, although they are illustrated in FIG. 2 as a series circuit, can alternatively or additionally also be operated in a parallel circuit, wherein the series circuit defines the voltage $U_{Batt}$ of the removable battery pack dropped across the energy supply contacts 42a, 44a, whereas a parallel circuit of individual energy storage cells 46 primarily increases the capacity of the removable battery pack 10. As already mentioned, individual cell clusters consisting of parallel-interconnected energy storage cells 46 can also be connected in series in order to achieve a specific voltage $U_{Batt}$ of the removable battery pack at the same time as an increased capacity. In current Li-ion energy storage cells 46 with a cell voltage $U_{Cell}$ of in each case 3.6 V, in the present exemplary embodiment a removable battery pack voltage $U_{Batt}=V_1-V_2$ of 5·3.6 V=18 V drops across the energy supply contacts 42a, 44a. Depending on the number of energy storage cells 46 connected in parallel in a cell cluster, the capacity of current removable battery packs 10 can be up to 12 Ah or more. However, the disclosure is not dependent on the type, construction, voltage, current-carrying ability, etc. of the energy storage cells 46 used, but instead can be applied to any removable battery packs 10 and energy storage cells 46.

To monitor the individual series-connected energy storage cells 46 or cell clusters of the removable battery pack 10, an SCM (single cell monitoring) preliminary stage 48 is provided. The SCM preliminary stage 48 has a multiplexer measuring apparatus 50, which can be connected in a high-impedance manner to corresponding taps 54 of the poles of the energy storage cells 46 or cell clusters via filter resistors 52. To detect the individual cell voltages $U_{Cell}$, the multiplexer measuring apparatus 50 switches over sequentially between the individual taps 54, for example by means of integrated transistors, which are not shown in more detail, in such a way that it is connected in each case to a positive and a negative pole of the energy storage cell 46 to be measured or the cell cluster to be measured. In the following text, the term energy storage cell is also intended to include the cell cluster, since these only influence the capacity of the removable battery pack 10, but are synonymous for detecting the cell voltages $U_{Cell}$. The filter resistors 52, which are configured, in particular, in a high-impedance manner, can prevent dangerous heating of the measuring inputs of the multiplexer measuring apparatus 50, in particular in the event of a fault.

The switchover of the multiplexer measuring apparatus 50 is effected by means of a first monitoring unit 56 integrated in the removable battery pack 10. Said monitoring unit can additionally close or open switching elements 58 of the SCM preliminary stage 48 that are connected in parallel with the energy storage cells 46 in order in this way to effect what is known as balancing of the energy storage cells 46 to achieve uniform charging and discharging states of the individual energy storage cells 46. It is likewise conceivable that the SCM preliminary stage 48 passes the measured cell voltages $U_{Cell}$ directly through to the first monitoring unit 56 such that the actual measurement of the cell voltages $U_{Cell}$ is carried out directly by the first monitoring unit 56, for example by means of an appropriate analog-to-digital converter (ADC).

The first monitoring unit 56 can be designed as an integrated circuit in the form of a microprocessor, ASIC, DSP or the like. However, it is likewise conceivable that the monitoring unit 56 consists of a plurality of microprocessors or at least partly of discrete components with appropriate transistor logic. In addition, the first monitoring unit 56 can have a memory for storing operating parameters of the removable battery pack 10, such as, for example, the voltage $U_{Batt}$, the cell voltages $U_{Cell}$, a temperature T, a charging or discharge current I or the like.

In addition to the first monitoring unit 56 in the removable battery pack 10, the electrical device 16 of the system has a further monitoring unit 60, which can be designed correspondingly to the first monitoring unit 56. The first and the further monitoring unit 56 and 60, respectively, can exchange information, preferably digitally, via a further contact 12a, 12b, designed as a signal or data contact 62a, 62b, of the two electromechanical interfaces 14, 24.

The further monitoring unit 60 of the electrical device 16 designed as a charging device 18 controls a power output stage 64, which is connected to the first and the second energy supply contact 42b, 44b of the further interface 24 and by means of which the removable battery pack 10 plugged into the charging device 18 can be charged using the charging current I and the voltage $U_{Batt}$ corresponding to the removable battery pack 10. For this purpose, the charging device 18 or the power output stage 64 is provided with a mains connection, which is not shown. The voltage $U_{Batt}$ applied to the energy supply contacts 42b, 44b can be measured by means of a voltage measuring apparatus 66 in the charging device 18 and evaluated by the further monitoring unit 60. The voltage measuring apparatus 66 can also be integrated fully or partly in the monitoring unit 60, for example in the form of an integrated ADC.

A temperature T of the removable battery pack 10 or the energy storage cells 46 can be measured by means of a temperature sensor 68, which is arranged in the removable battery pack 10 and preferably designed as an NTC and is in close thermal contact with at least one of the energy storage cells 46, and evaluated by the further monitoring unit 60 of the charging device 18. To this end, the temperature sensor 68 is connected on one side to the second reference potential $V_2$, in particular to the ground potential GND, which is applied to the second energy supply contact 44a, via a switching element 70, for example a bipolar transistor or MOSFET, which is integrated in the removable battery pack 10, and on the other side to a contact 12a, designed as a signal or data contact 72a, of the first interface 14 of the removable battery pack 10. A signal or data contact 72b is accordingly provided in the further interface 24 of the charging device 18, said contact being connected to the further monitoring unit 60. Furthermore, a connection exists between the signal or data contact 72a of the first interface 14 of the removable battery pack 10 and the first monitoring unit 56 of the removable battery pack 10. Via said connection, the first monitoring unit 56 can determine whether the temperature T measured by the temperature sensor 68 has been requested by the further monitoring unit 60 of the charging device 18. If this is the case, the first monitoring unit 56 is transferred automatically from a quiescent mode to an operating mode. If there has been no such request, the quiescent mode of the first monitoring unit 56 allows significantly longer idle and storage times of the removable battery pack 10 due to the reduced quiescent current.

In order that the charging device 18 can identify the removable battery pack 10 and, if necessary, enable it for charging, the removable battery pack 10 has a first coding resistor 74, which is connected on one side to the second reference potential $V_2$, in particular to the ground potential GND, which is applied to the second energy supply contact 44b and on the other side to the contact 12a, designed as a signal or data contact 62a, of the first interface 14 of the removable battery pack 10. If the resistance value of the first coding resistor 74 corresponds to a value stored in the further monitoring unit 56 of the charging device 60, the charging device 18 enables the charging process and charges the removable battery pack 10 according to the charging parameters stored in a look-up table, in particular the charging current I, the charging voltage $U_{Batt}$, the permissible temperature range, etc. In addition to the first coding resistor 74, a second coding resistor 76 is also provided in the removable battery pack 10, said second coding resistor being connected, in a manner corresponding to the first coding resistor 74, to the second reference potential $V_2$ and a further contact 12a, designed as a signal or data contact 78a, of the first interface 14 of the removable battery pack 10. An electrical device 16 designed as an electrical consumer 22 can enable the discharging process of the removable battery pack 10 by means of the second coding resistor 76. To this end, analogously to the charging device 18, the electrical consumer 22 has a further monitoring unit 60, which requests the resistance value of the second coding resistor 76 by means of a contact 12b, designed as a signal or data contact 78b, of the further interface 24 and compares it with a stored value. If the values do not correspond, the discharging process of the removable battery pack 10 is terminated or not permitted, with the result that the electrical consumer 22 cannot be set into operation. When they correspond, an operator can set the electrical consumer 22 into operation. This particularly advantageously allows operation of removable battery packs 10 of different power classes with identical electromechanical interfaces 14 or 24. It is self-evident that, in the case of an electrical consumer 22, the power output stage 64 contained in the charging device 18 is designed as a drive unit, for example as an electric motor (possibly with power output stage accordingly connected upstream) or another unit that consumes energy. The configuration of such a unit will not be dealt with further here since it is well known to a person skilled in the art for a wide variety of types of electrical consumers 22 and also does not have any critical importance for the disclosure.

The removable battery pack 10 has a measuring amplifier 80, the input side of which is connected between the further electrical contact 12a, designed as a signal or data contact 78a, of the first interface 14 and the second coding resistor 76. The output side of the measuring amplifier 80 is connected to the first monitoring unit 56 of the removable battery pack 10. The amplification of the measuring amplifier 80 can be adjusted where necessary by the first monitoring unit 56 via a corresponding control line. As an alternative, it is also conceivable that the second coding resistor 76 is connected to the first monitoring unit 56 directly or via a filter circuit 82, for example a protective diode. This option is illustrated in FIG. 2 using dashes.

The charging device 18 has a first current measuring apparatus 84 having a first current measuring amplifier 86, the input side of which is connected to a first current sensor 88 connected to the second energy supply contact 44*b* of the further interface 24 and the output side of which is connected to the signal or data contact 78*b* of the further interface 24 via a pull-up resistor 90. The first current sensor 88 can be designed, for example, as a shunt resistor, a Hall sensor, a magnetic field sensor, a DC-isolated current clamp or the like. The first current measuring amplifier 86 can be designed as a microcontroller, an op amp, a corresponding discrete circuit or the like. A potential resulting from the second coding resistor 76 of the removable battery pack 10, the pull-up resistor 90 in the charging device 18 and the charging current I is therefore produced at the signal or data contact 78*b*.

In addition to the first current measuring apparatus 84, a second current measuring apparatus 92 is provided in the charging device 18 for measuring the charging current I by means of a second current measuring amplifier 94 and a second current sensor 96, which is connected in series with the first current sensor 88 of the first current measuring apparatus 84. For this purpose, the second current measuring apparatus 92 is connected to the further monitoring unit 60 of the charging device 18. As an alternative, it is also possible to connect the second current sensor 96 to the further monitoring unit 60 directly or via a filter circuit, for example in the form of an interconnected protective diode, provided said monitoring unit has a corresponding ADC. This option is not illustrated in FIG. 2 for reasons of clarity. The second current sensor 96 and the second current measuring amplifier 94 can be designed correspondingly to the first current sensor 88 and the first current measuring amplifier 86.

The first monitoring device 56 of the removable battery pack 10 and the further monitoring unit 60 of the charging device 18 now each count the faulty charging processes. In this case, a faulty charging process is present when relevant charging parameters, in particular of the removable battery pack 10, such as, for example, the temperature T, the charging or discharge current I, the voltage $U_{Batt}$, one of the cell voltages $U_{Cell}$, the remaining capacity or the like, are outside of their limit values required for a permissible operating range.

If there is a correspondence regarding the relevant charging parameters in the first monitoring unit 56 of the removable battery pack 10 and the further monitoring unit 60 of the charging device 18, then the charging process is started by the further monitoring unit 60. Otherwise, the charging process is ended or not started and is counted as a faulty charging process of said two charging partners and the respectively updated counter reading is stored in both monitoring units 56, 50.

A defined limit value $X_{max}$ of maximum permitted faulty charging processes, for example 100, which may not be exceeded, is also stored in each monitoring unit 56, 60 of the charging partners 10, 18. After the limit value $X_{max}$ has been exceeded, the removable battery pack 10 and the charging device 18 are automatically blocked so that a charging process can no longer be started between these charging partners 10, 18 even in the case of corresponding charging parameters. The faulty removable battery pack 10 and the faulty charging device 18 are then likewise also blocked for other charging partners.

As long as there is no blocking of one of the charging partners 10, 18, the first monitoring unit 56 and/or the further monitoring unit 60 can each reset the number of faulty charging processes after a successful charging process. A successful charging process can be used as an indication that the two current charging partners 10, 18 do not exhibit a fault state and the fault has more likely been caused by another charging partner.

As an alternative or in addition, it is conceivable that the charging current I is initially reduced by the further monitoring unit 60 of the charging device 18 when the limit value $X_{max}$ of maximum permitted faulty charging processes is exceeded. It is likewise conceivable that the permissible temperature range is limited and/or the maximum charging voltage is reduced. Blocking for future charging processes can then take place, for example, when a further tolerance limit of 10% of the limit value $X_{max}$ has been exceeded.

It is furthermore possible that the first monitoring unit 56 and the further monitoring unit 60 each additionally count the successful charging processes. Therefore, each charging partner 10, 18 can then individually determine a reliability value Z by virtue of the ratio of the successful charging processes to the overall number of all charging processes being calculated. If this ratio in a charging partner 10, 18 falls below a defined threshold value of, for example, 30%, the first monitoring unit 56 and/or the further monitoring unit 60 block the faulty charging partner 10 and/or 18 for future charging processes.

Identification information, for example a serial number, a MAC address or the like, can additionally be exchanged between the first and the further monitoring unit 56 and 60, respectively, such that both monitoring units 56, 60 concomitantly detect the counted charging processes of the respective other monitoring unit 56, 60 in order to calculate a reliability value Z therefrom. Therefore, each charging partner 10, 18 can keep count of the successful and the unsuccessful charging processes for the respective other charging partner 10, 18. The removable battery pack 10 thus knows by which charging devices 18 it has previously been charged. The charging device 18 likewise knows which removable battery packs 10 it has previously charged. In this way, each removable battery pack 10 or each charging device 18 can reliably assess with which charging partner 10, 18 it is in contact and, if a fault state has been identified, which charging partner 10, 18 is essentially responsible for this fault state. If, for example, a removable battery pack 10 is charged using three different charging devices 18, wherein a combination of the charging partners 10, 18 results in an identified fault state, precisely this combination or the allegedly faulty charging device 18 can be blocked. Likewise, a charging device 18 that can still charge one of three removable battery packs 10 but can no longer charge the other two can identify that a fault state would obviously be present both in the charging device 10 and in the removable battery pack 10 still chargeable thereby on account of an erroneous correspondence with the still chargeable removal battery pack 10.

Provision can furthermore be made for the calculated reliability values Z to also be exchanged between the first and the further monitoring unit 56, 60 of the charging partners 10, 18. If, for example, both charging partners 10, 18 determine that there is no correspondence of the charging parameters, the charging partners 10, 18 mutually communicate with one another how many different further charging partners they previously had an unsuccessful and a successful charging process with and how often. Therefore, each of the two current charging partners 10, 18 can assess the relevance of the estimation of the respective other charging partner 10, 18 with respect to the non-correspondence of the charging parameters.

The reliability values Z can particularly advantageously be stored in the first and the further monitoring unit 56, 60. If, in the case of a charging process with two charging partners 10, 18, of which, for example, the charging device 18 has a reliability value Z of 100%, that is to say could previously successfully charge any removable battery pack 10, while the removable battery pack 10 currently to be charged has only a reliability value Z of 50%, that is to say already has at least one unsuccessful charging process behind it, an absent correspondence of the charging parameters is determined, it is suggested that it is probable that only the removable battery pack 10 to be charged but not the charging device 18 exhibits a fault state. Accordingly, the removable battery pack 10 can be blocked for future charging processes when its reliability value Z falls below a defined threshold value while the reliability value Z of the charging device 18 is not reduced at all or is reduced only slightly.

Furthermore, the method according to the disclosure can make provision for the counted charging processes and/or the calculated reliability values Z to each be stored in chronological order by the first and the further monitoring unit 56, 60 of the charging partners 10, 18. Therefore, for example, more recent events can be given a higher weighting than older events in order to calculate the reliability values Z. If, in the case of a current charging process, a fault state is detected, a lower number of more recent failed charging processes as a result counts more than a higher number of older successful charging processes. This takes into account the property that a previously fault-free charging partner 10, 18 can suffer from a defect with a greater probability than a previously faulty charging partner 10, 18 becoming fault-free again.

As already mentioned, the method can be used not only for an electrical device 16 designed as a charging device 18 but also for a diagnostic device 20 or an electrical consumer 22. The determination of the reliability values Z in the removable battery pack 10 is then also based on corresponding successful and/or unsuccessful discharging processes in addition to the successful and/or unsuccessful charging processes.

In order to signal a piece of information about the number of faulty charging or discharging processes and/or about the reliability values Z, the charging device 18 and/or the removable battery pack 10 have an appropriate display (not shown in more detail) in the form of LEDs, a display screen and/or an acoustic signal generator. If the electrical device 18 is designed as a diagnostic device 20 or an electrical consumer 22, the display can additionally or alternatively also be designed as a haptic signal generator, for example in the form of a vibration motor. In the case of an electrical consumer 22 driven by electric motor, it is also conceivable that a drive motor for an insert tool serves as haptic and/or acoustic signal generator.

Finally, it should be pointed out that the exemplary embodiments shown are not restricted either to FIGS. 1 and 2 nor to the number and type of removable battery packs 10 and electrical devices 16 shown therein. The same applies to the number of energy storage cells 46 and the associated configuration of the multiplexer measuring apparatus 48. The configurations of the interfaces 14, 24 and the number of contacts 12a, 12b thereof shown should also be understood as purely exemplary.

What is claimed is:

1. A method for detecting electrical fault states of at least one removable battery pack and/or an electrical device configured to connect to the at least one removable battery pack, the method comprising:
   counting (i) faulty charging or discharging processes and (ii) successful charging or discharging processes of the at least one removable battery pack and/or the electrical device using a first monitoring unit integrated in the at least one removable battery pack, the first monitoring unit being configured to detect electrical fault states of the at least one removable battery pack;
   counting (i) the faulty charging or discharging processes using a second monitoring unit integrated in the electrical device and (ii) the successful charging or discharging processes of the at least one removable battery pack and/or the electrical device, the second monitoring unit being configured to detect electrical fault states of the electrical device; and
   at least one of terminating, blocking, and reducing the charging or discharging processes using the first monitoring unit or the second monitoring unit in response to a ratio of the successful charging or discharging processes to an overall number of all charging or discharging processes being less than a defined threshold value,
   wherein the at least one removable battery pack includes a first electromechanical interface having a first plurality of electrical contacts and the electrical device includes a second electromechanical interface having a second plurality of electrical contacts, and
   wherein in each of the first and second plurality of electrical contacts (i) a first electrical contact is an energy supply contact configured to be supplied with a first reference potential, (ii) a second electrical contact is another energy supply contact configured to be supplied with a second reference potential, and (iii) a third electrical contact is configured as a signal or data contact configured to exchange data between the first and the second monitoring units.

2. The method according to claim 1, wherein the faulty charging or discharging processes are present when relevant charging or discharging parameters are outside of predetermined limit values corresponding to a permissible operating range.

3. The method according to claim 1, further comprising:
   at least one of terminating, blocking, and reducing the charging or discharging processes using the first monitoring unit or the second monitoring unit in response to a defined limit value of maximum permitted faulty charging or discharging processes being exceeded by the at least one removable battery pack or the electrical device.

4. The method according to claim 1, further comprising:
   exchanging identification information between the first and the second monitoring units, such that the first and the second monitoring units concomitantly detect the counted charging or discharging processes of the respective other monitoring unit in order to calculate a reliability value therefrom.

5. The method according to claim 4, further comprising:
   exchanging the calculated reliability values between the first and the second monitoring units.

6. The method according to claim 4, further comprising:
storing the counted charging or discharging processes and/or the calculated reliability values in chronological order using the first and the second monitoring unit.

7. The method according to claim 6, further comprising:
assigning a higher weighting to more recent counted charging or discharging processes than older counted charging or discharging processes.

8. The method according to claim 1, further comprising:
resetting a number of the counted faulty charging or discharging processes using the first monitoring unit and/or the second monitoring unit after a successful charging or discharging process.

9. The method according to claim 4, further comprising:
signalling a piece of information about a number of the counted faulty charging or discharging processes and/or about the reliability values to an operator in an acoustic, optical, and/or haptic manner at the at least one removable battery pack and/or at the electrical device.

10. A system comprising:
at least one removable battery pack including a first monitoring unit and a first electromechanical interface having a first plurality of electrical contacts; and
an electrical device including a second monitoring unit and a second electromechanical interface having a second plurality of electrical contacts,
wherein in each of the first and second plurality of electrical contacts (i) a first electrical contact is as an energy supply contact configured to be supplied with a first reference potential, (ii) a second electrical contact is another energy supply contact configured to be supplied with a second reference potential, and (iii) a third electrical contact is configured as a signal or data contact configured to exchange data between the first and the second monitoring units,
wherein the first and the second monitoring units are configured to detect electrical fault states of the at least one removable battery pack and/or the electrical device,
wherein the first monitoring unit is configured to count (i) faulty charging or discharging processes and (ii) successful charging or discharging processes of the at least one removable battery pack and/or the electrical device, and
wherein the second monitoring unit is configured to count (i) the faulty charging or discharging processes and (ii) the successful charging or discharging processes of the at least one removable battery pack and/or the electrical device,
wherein the charging or discharging processes is at least one of terminated, blocked, and reduced using the first monitoring unit or the second monitoring unit in response to a ratio of the successful charging or discharging processes to an overall number of all charging or discharging processes being less than a defined threshold value.

11. The system according to claim 10, wherein the at least one removable battery pack and/or the electrical device each have an optical signalling device, an acoustic signalling device, and/or a haptic signalling device configured to signal a piece of information about a number of the counted faulty charging or discharging processes and/or about a reliability value determined by at least one of the first and the second monitoring devices.

* * * * *

UNITED STATES PATENT AND TRADEMARK OFFICE
CERTIFICATE OF CORRECTION

PATENT NO. : 11,979,040 B2
APPLICATION NO. : 17/380155
DATED : May 7, 2024
INVENTOR(S) : Klee et al.

Page 1 of 1

It is certified that error appears in the above-identified patent and that said Letters Patent is hereby corrected as shown below:

In the Claims

In Claim 10, at Column 13, Lines 29-30: "a first electrical contact is as an energy supply contact" should read --a first electrical contact is an energy supply contact--.

Signed and Sealed this
Third Day of December, 2024

Katherine Kelly Vidal
*Director of the United States Patent and Trademark Office*